Dec. 9, 1958     D. F. STEWART     2,863,338
MAGNETIC BASE TOOL SUPPORT
Filed Jan. 31, 1957
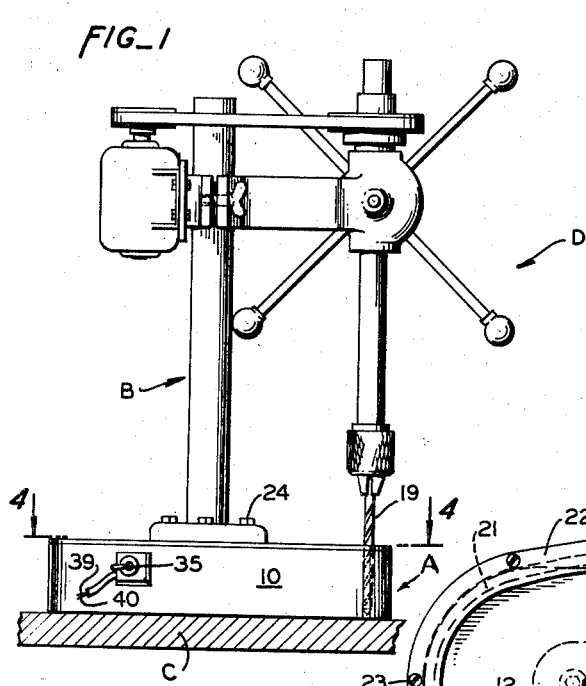
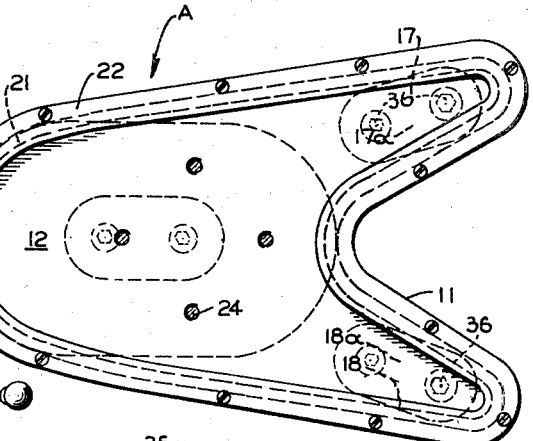
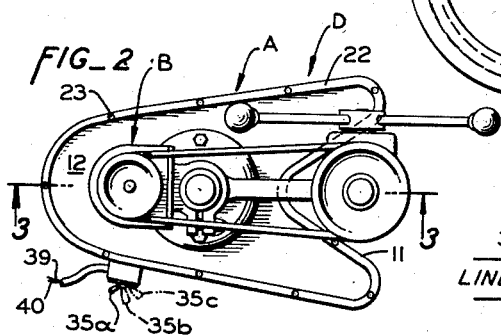
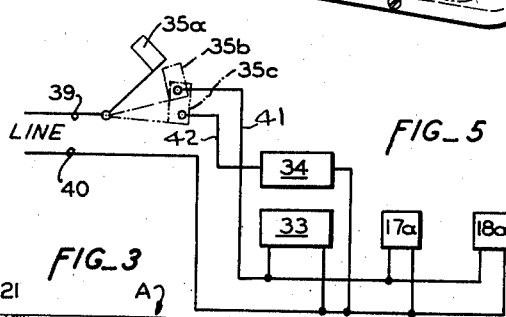
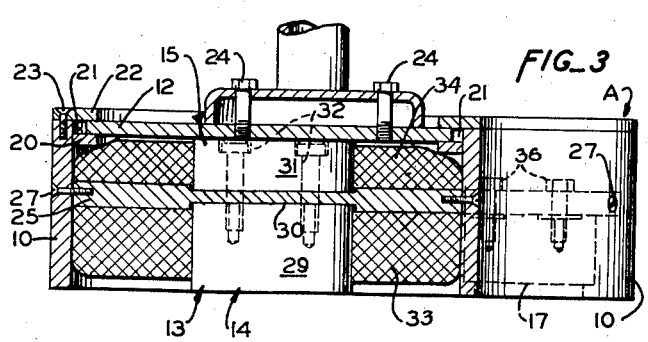
INVENTOR.
DONALD F. STEWART
BY *Hansen and Lane*
ATTORNEYS United States Patent Office 2,863,338
Patented Dec. 9, 1958

2,863,338

MAGNETIC BASE TOOL SUPPORT

Donald F. Stewart, San Jose, Calif.

Application January 31, 1957, Serial No. 637,470

7 Claims. (Cl. 77—7)

The present invention relates to a magnetic base tool support, and pertains more particularly to such a support wherein a tool mounted thereon may be adjusted for final precision setting after the support has been initially magnetically attached to a workpiece.

In working on large workpieces of iron and steel which are too heavy or cumbersome to be readily set up on ordinary, stationary type machine tools, it sometimes is preferable to employ a tool which can be brought to the workpiece. Various types of portable tools, such as hand drills, are commonly employed for this purpose, but where accurate drilling or machining is to be performed it frequently becomes necessary to mount a power tool in accurate relation upon the workpiece.

In such instances it is customary to employ some sort of a jig or fixture for mounting the tool on the workpiece, and in the past several tool supports have been devised employing magnets for attaching a tool to such a workpiece.

Such magnetically attached tool supports have definite advantages over some other types of mounting arrangements. However, final adjustment of such a tool sometimes is difficult, because once the tool is magnetically attached to the workpiece, final adjustment usually must be made by bumping the magnetically attached base as with a hammer to bring the tool into final accurate register with its point of application to the workpiece.

The present invention contemplates the provision of a magnetic base for mounting a tool on a magnetically permeable workpiece, with means for facilitating final accurate alignment of the tool with a required point of application on the workpiece.

The invention also provides a magnetic base for mounting a tool on a magnetically permeable workpiece, said base having a laterally adjustable top plate of magnetic material, means being provided for initially anchoring the floating plate in adjustable position and then finally anchoring it in adjusted position.

The invention further provides a magnetic base for mounting a tool on a magnetic workpiece wherein the base is formed with a notch therein, and means are provided for mounting a tool on the base with the working zone of the tool in the notch.

The invention also provides a notched magnetic base for mounting a tool on a magnetic workpiece, with one attaching magnet in the base, and another on each side of the notch to firmly attach the base to a workpiece.

Another object of the invention is to provide an improved magnetic base for attaching a tool to a magnetic workpiece.

These, and other objects and advantages of the invention, will be apparent from the following description and the accompanying drawings, wherein Fig. 1 is a side elevational view of an electric drill press mounted on a magnetic base embodying the invention, a magnetically permeable workpiece being shown sectionally.

Fig. 2 is a top plan view of the arrangement shown in Fig. 1, the magnet energizing switch being shown in broken lines in different adjusted positions.

Fig. 3 is an enlarged, fragmentary, sectional view through the magnetic base taken along line 3—3 of Fig. 2, a portion of a drill press being shown mounted thereon.

Fig. 4 is a similarly enlarged sectional view taken along line 4—4 of Fig. 1.

Fig. 5 is a circuit diagram showing one form of circuit for selectively energizing the magnets.

Briefly, the illustrated form of the invention comprises a magnetic base assembly A for mounting a tool, such as a drill press B on a magnetic workpiece C. The base A comprises an outer wall 10 with a re-entrant angle or notch 11 formed in one end thereof.

A laterally adjustable tool support plate 12 is mounted in the upper end of the housing.

A main magnet assembly 13 comprises a lower electromagnet 14 for exerting a powerful gripping influence on the magnetically permeable workpiece C (Fig. 1) and an upper magnet 15 mounted co-axially therewith for anchoring the slidably adjustable tool support plate 12 in adjusted position.

Additional electro-magnets 17 and 18 also may be provided on opposite sides of the notch 11 to retain the base A against outward stresses away from the workpiece imposed by application of a tool, such as the drill 19, to the workpiece.

Referring to the drawings in detail, the outer wall 10 may be of any suitable material, such as steel, and is of generally Y-shape with the re-entrant notch 11 formed in one end thereof. A shelf strip 20 for supporting the top plate 12 is fixedly secured to the interior of the wall 10 as by brazing, and the magnetically permeable top plate 12 mounted thereon conforms to the interior shape of the wall 10 but has sufficient marginal clearance therefrom at 21 (Figs. 3 and 4) to permit the plate 12 to be moved laterally in any direction in the plane of the plate.

The plate 12 is retained on the shelf strip 20 by a retaining rim 22 secured to the side wall 10 by screws 23. A tool, such as the drill press B, is secured to the plate 12 by suitable means, such as machine screws 24. The main magnet assembly 13, including the lower magnet 14 and upper magnet 15, is mounted on a fixed plate 25, preferably of non-magnetic material such as aluminum, which is fitted into the wall 10 and is secured substantially medially therein by screws 27.

The core 29 of the lower magnet 14 is of magnetically permeable material, such as soft iron, the upper end of which is fitted into a recess provided therefor in the medial plate 25, while the lower end of the core 31 of the upper magnet 15 is similarly fitted into a recess provided on the upper side of the plate 25. The cores 29 and 31 are secured together, preferably co-axially, by screws 32 inserted through holes provided therefor in the upper core 31 and plate 25, and screwed into threaded holes provided therefor in the lower core 29. By making these screws of iron, the magnetic effect on the upper core 31 by energization of a lower magnet coil 33 only will be greater than if these screws were of non-magnetic material such as brass or aluminum. Usually it is preferred to have these screws 32 of non-magnetic material so as not to exert too much magnetic pull on the top plate when the lower magnet 14 only is energized.

The lower magnet coil 33 is wound upon the lower core 29, and an upper coil 34 is wound on the upper core 31. The coils 33 and 34 are connected by conventional circuit means to a three-way switch 35, which, in a first, or "off" position 35a (Figs. 2 and 5) de-energizes both coils 33 and 34, in a second position 35b energizes only the lower coil 33, and in a third position 35c energizes both coils.

In the event that auxiliary electro-magnets 17 and 18 are provided (Figs. 3 and 4) on opposite sides of the notch 11, the latter magnets are mounted on the under side of the medial plate 25 by screws 36 (Figs. 4 and 5), and their coils 17a and 18a (Fig. 5) preferably are connected in parallel with the lower magnet coil 33 so as to operate in conjunction therewith.

A circuit suitable for selectively controlling energization of the coils in accordance with the invention is shown schematically in Fig. 5. In the solid line position 35a of the switch 35 (Fig. 4) the circuit is open. In the broken line position 35b of the switch a circuit is closed from line conductors 39 and 40, through conductor 41 and thence through the lower magnet coil 33 and the two auxiliary coils 17a and 18a, providing the latter are used. In the position 35c of the switch, a circuit is closed from the line conductors 39 and 40 through both the conductors 41 and 42 and thence through all of the coils 17a, 18a, 33 and 34.

In using the invention, a desired tool, such as the drill press B, is mounted on the laterally adjustable top plate 12 by the mounting screws 24. Conductors 39 and 40 leading to the coil circuit, such as that illustrated in Fig. 4, then are connected to a suitable source of electrical current.

The entire assembly D comprising the magnetic base assembly A and tool B is then mounted at a desired location on a magnetically permeable workpiece C with the point of the drill 19 located approximately over a desired point of application. The switch 35 then is operated to energize the lower electro-magnet 14, and also, if provided, the two auxiliary magnets 17 and 18, thereby securely attaching the assembly D to the workpiece.

Due to the proximity and co-axial location of the upper magnet core 31 to the lower core 29, energization of the lower magnet 14 also creates a flux flow through the upper core 31 sufficient to attract the plate 12 thereto with sufficient force to hold the plate against slippage, but not sufficient to anchor it fully against lateral adjustability.

The plate 12 then may be adjusted laterally within the limits of the clearance space 21 marginally around the plate to position the drill 19 in exactly centered condition over a desired point of application. The switch 35 then is again operated to also energize the upper magnet 15, which thereupon securely anchors the plate 12 against lateral displacement during use of the tool B.

The plate 12 may be freed for re-adjustment if desired by de-energizing the upper magnet 15 while leaving the lower magnet 14 and the auxiliary magnets 17 and 18 energized. When it is desired to release the assembly D from the workpiece C, the switch 35 may be moved to "off" position to de-energize all of the magnets.

The invention provides a magnetic base for supporting a power tool or other device on a magnetically permeable workpiece, and one which provides for a powerful initial clamping of the base to the workpiece while still leaving the tool adjustable for final centering, and also provides means for powerfully anchoring the tool in a finally adjusted position.

While I have illustrated and described a preferred embodiment of the present invention, it will be understood however, that various changes and modifications may be made in the details thereof without departing from the scope of the invention as set forth in the appended claims.

Having thus described the invention, what I claim as new desire to protect by Letters Patent is defined in the following claims.

I claim:

1. A magnetic base for a tool comprising an enclosing wall, the lower edge of which defines a plane for mounting on a magnetically permeable workpiece, a magnetically permeable tool support plate mounted transversely within said wall and spaced marginally therefrom, guide means retaining said plate against vertical displacement while leaving it free for lateral adjustment within the limits provided by its marginal clearance from the wall, a first electromagnet in said housing spaced downwardly from said tool support plate and terminating substantially flush with the bottom of said housing for anchoring the housing securely to a magnetically permeable workpiece upon which the housing is positioned, a second electromagnet mounted co-axially above the first magnet and terminating closely beneath the tool support plate, and switch means for sequentially connecting the two electromagnets to a predetermined source of electrical current, thereby energizing first the first electro-magnet and secondly both first and second magnets, thereby first to magnetically attach the base to a magnetically permeable workpiece upon which the latter is mounted, and secondly to magnetically anchor the tool support plate in adjusted condition in the housing.

2. A magnetic base for a tool comprising a housing for mounting on a magnetically permeable workpiece, said housing having a re-entrant notch in a side thereof to receive a tool element for application to a workpiece therein, a magnetically permeable tool support plate mounted transversely of the upper portion of said housing and free for limited lateral adjustment therein, a first electro-magnet in said housing spaced downwardly from said tool support plate and terminating substantially flush with the bottom of said housing for anchoring the housing securely to a magnetically permeable workpiece upon which the housing is positioned, a second electromagnet spaced upwardly from the bottom of said housing and terminating closely adjacent the tool support plate, a pair of auxiliary electro-magnets mounted in the housing one on each side of the notch therein, said auxiliary magnets terminating substantially flush with the bottom of the housing and spaced from said tool support plate, and switch means for sequentially energizing first the lower electro-magnet and both auxiliary magnets, and secondly all of the first, second and auxiliary magnets, hereby first to magnetically attach the base to a magnetically permeable workpiece upon which the latter is mounted, and secondly to magnetically anchor the tool support plate in laterally adjusted condition in the housing.

3. A magnetic base for a tool comprising a housing, a tool support plate of magnetically permeable material mounted in an upper portion of said housing and spaced marginally therefrom, guide means acting between the housing and the plate to prevent vertical displacement of the plate while leaving it free for limited lateral slidable movement within the limits provided by the marginal clearance between the plate and the housing, a lower electro-magnet secured within said housing with its lower end closely adjacent the lower extremity of the housing and its upper end spaced downwardly from said plate, and of sufficient strength, when energized by a predetermined electrical current, to attach the housing firmly to a magnetically permeable workpiece upon which the housing is mounted without substantially restraining the plate for lateral adjustment, a second electro-magnet mounted in said housing closely beneath the tool support plate, and selective switch means for electrically connecting the electro-magnets in sequence to a source of electrical current, thereby to energize first the lower electro-magnet to magnetically attach the housing to such magnetically permeable workpiece leaving the tool support plate free for lateral adjustment, and then the upper electro-magnet to magnetically anchor the tool support plate against lateral movement in the housing.

4. A magnetic base for a tool comprising a generally Y-shaped housing having a notch in one end thereof, a tool support plate of magnetically permeable material mounted in said housing and free for limited lateral slidable movement therein, a first magnet of predetermined strength secured within said housing at the juncture of the arms thereof with its lower end closely adjacent the lower extremity of the housing and spaced substantially from said plate, an auxiliary magnet similarly mounted in each arm of the housing defining the notch therein, a plate anchoring magnet mounted in said housing closely adjacent the tool support plate therein, and means for sequentially energizing first the first and auxiliary magnets to magnetically attach the housing to such magnetically permeable workpiece leaving the tool support plate free for later adjustment in the housing, and then the plate anchoring magnet, thereby to magnetically anchor the tool support plate against lateral movement in the housing.

5. A magnetic base for a tool comprising a closed, upright wall enclosing a generally Y-shaped space, the lower edge of said wall defining a plane, a plate support strip secured interiorly of said wall adjacent its upper end, a tool support plate of magnetically permeable material and of a shape conforming to the Y-shaped space mounted on said strip in said housing and spaced edgewise thereof from said wall to be free for limited lateral slidable movement therein, a first magnet of predetermined strength secured within the wall with the lower end of said first magnet closely adjacent the plane defined by the lower edge of said wall, a second magnet secured within the wall and extending closely adjacent the tool support plate, and means for sequentially energizing first the first magnet to magnetically attach the base to such magnetically permeable workpiece leaving the tool support plate free for later adjustment, and then the second magnet to magnetically anchor the tool support plate against lateral movement in the base, whereby a machine tool mounted on said plate and having a workpiece engaging portion thereof engaging a workpiece beyond said wall is firmly held against displacement by working stresses imposed on the tool.

6. A magnetic base for a tool comprising a closed, upright wall enclosing a generally Y-shaped space, a plate support strip secured interiorly of said wall adjacent its upper end, a tool support plate of magnetically permeable material and of a shape conforming to the Y-shaped space mounted on said strip in said housing and spaced edgewise thereof from said wall to be free for limited lateral slidable movement therein, a Y-shaped non-magnetic plate fitted and secured within said wall in downwardly spaced, parallel relation to said tool support plate, a first magnet of predetermined strength secured to the under side of said non-magnetic plate substantially centrally thereof, and with the lower end of said first magnet closely adjacent the lower extremity of the space enclosed by said wall, a pair of auxiliary magnets secured one to the under side of each arm of the Y-shaped non-magnetic plate and with their lower ends closely adjacent the lower extremity of the space enclosed by said wall, a plate anchoring magnet secured to the upper side of said non-magnetic plate and extending closely adjacent the tool support plate, and means for sequentially energizing first the first magnet and the auxiliary magnets to magnetically attach the housing to such magnetically permeable workpiece leaving the tool support plate free for later adjustment, and then the plate anchoring magnet to magnetically anchor the tool support plate against lateral movement in the housing.

7. A magnetic base for a tool comprising an enclosing wall with its lower edge defining a plane for mounting on a magnetically permeable workpiece, a support shelf extending inwardly from an upper portion of said wall, a magnetically permeable tool support plate mounted on said shelf and extending transversely within said wall and spaced marginally from said wall for limited lateral adjustment therein, a first magnet mounted within said wall and spaced from said tool support plate and terminating substantially flush with the plane defined by the lower edge of said wall for anchoring the base securely to a magnetically permeable workpiece upon which the base is positioned, a second magnet mounted within said wall and terminating closely beneath the tool support plate, and means for sequentially energizing first the first magnet and secondly both first and second magnets thereby first to magnetically attach the base to a magnetically permeable workpiece upon which the base is mounted, and secondly to magnetically anchor the tool support plate downwardly into tight frictional engagement with its supporting shelf, thereby to anchor said plate in laterally adjusted condition relative to the wall and to such workpiece.

References Cited in the file of this patent

UNITED STATES PATENTS

| | | |
|---|---|---|
| 676,043 | Lincoln | June 11, 1901 |
| 807,517 | Vance | Dec. 19, 1905 |
| 2,622,457 | Buck | Dec. 23, 1952 |